US012271945B2

United States Patent
Merrill et al.

(10) Patent No.: US 12,271,945 B2
(45) Date of Patent: Apr. 8, 2025

(54) ADVERSE ACTION SYSTEMS AND METHODS FOR COMMUNICATING ADVERSE ACTION NOTIFICATIONS FOR PROCESSING SYSTEMS USING DIFFERENT ENSEMBLE MODULES

(71) Applicant: ZestFinance, Inc., Los Angeles, CA (US)

(72) Inventors: John W. L. Merrill, Redmond, WA (US); Shawn M. Budde, Evanston, IL (US); John Candido, Burbank, CA (US); Lingyun Gu, Thousand Oaks, CA (US); Farshad Kheiri, Woodland Hills, CA (US); James P. McGuire, Long Beach, CA (US); Douglas C. Merrill, Los Angeles, CA (US); Manoj Pinnamaneni, Los Angeles, CA (US); Marick Sinay, Hawthorne, CA (US)

(73) Assignee: ZestFinance, Inc., Los Angeles, CA (US)

( * ) Notice: Subject to any disclaimer, the term of this patent is extended or adjusted under 35 U.S.C. 154(b) by 0 days.

(21) Appl. No.: 16/109,545

(22) Filed: Aug. 22, 2018

(65) Prior Publication Data
US 2018/0365765 A1 Dec. 20, 2018

Related U.S. Application Data

(63) Continuation of application No. 14/954,825, filed on Nov. 30, 2015, now abandoned, which is a
(Continued)

(51) Int. Cl.
*G06Q 40/03* (2023.01)
*G06N 20/00* (2019.01)

(52) U.S. Cl.
CPC ............. *G06Q 40/03* (2023.01); *G06N 20/00* (2019.01)

(58) Field of Classification Search
CPC .............................. G06Q 40/03; G06N 20/00
See application file for complete search history.

(56) References Cited

U.S. PATENT DOCUMENTS

| 525,413 A | 9/1894 | Gates |
| 5,222,192 A * | 6/1993 | Shaefer ................. G06N 3/126 706/13 |

(Continued)

FOREIGN PATENT DOCUMENTS

| WO | WO-0028453 A1 * | 5/2000 | ............. G06Q 30/02 |
| WO | WO-2005098647 A2 * | 10/2005 | ............. G06N 3/086 |

(Continued)

OTHER PUBLICATIONS

Wikipedia Search, "Genetic Algorithm", May 5, 2021 at: https://en.wikipedia.org/wiki/Genetic_algorithm.*
(Continued)

*Primary Examiner* — Abhishek Vyas
*Assistant Examiner* — William B. Bunker
(74) *Attorney, Agent, or Firm* — TROUTMAN PEPPER LOCKE LLP; Christopher J. Forstner; Nicholas J. Gallo

(57) ABSTRACT

This invention relates generally to the personal finance and banking field, and more particularly to the field of lending and credit notification methods and systems. Preferred embodiments of the present invention provide systems and methods for automatically generating high quality adverse action notifications based on identifying variations between a declined borrower's profile and that of approved applicants, both with simple and sophisticated credit scoring systems, using specific algorithms.

12 Claims, 8 Drawing Sheets

Related U.S. Application Data continuation of application No. 14/169,400, filed on Jan. 31, 2014, now abandoned.

(60) Provisional application No. 61/759,081, filed on Jan. 31, 2013.

(56) References Cited

U.S. PATENT DOCUMENTS

| | | | |
|---|---|---|---|
| 5,745,654 A * | 4/1998 | Titan | G06N 3/105 706/20 |
| 5,999,938 A | 12/1999 | Bliss et al. | |
| 6,034,314 A | 3/2000 | Koike | |
| 6,877,656 B1 | 4/2005 | Jaros et al. | |
| 6,941,287 B1 * | 9/2005 | Vaidyanathan | G06N 3/126 706/14 |
| 7,035,811 B2 | 4/2006 | Gorenstein | |
| 7,280,980 B1 | 10/2007 | Hoadley et al. | |
| 7,467,116 B2 | 12/2008 | Wang | |
| 7,499,919 B2 | 3/2009 | Meyerzon et al. | |
| 7,542,993 B2 | 6/2009 | Satterfield et al. | |
| 7,610,257 B1 | 10/2009 | Abrahams | |
| 7,711,635 B2 | 5/2010 | Steele et al. | |
| 7,765,151 B1 | 7/2010 | Williams et al. | |
| 7,813,945 B2 | 10/2010 | Bonissone | |
| 7,873,535 B2 | 1/2011 | Umblijs et al. | |
| 7,873,570 B2 | 1/2011 | Cagan et al. | |
| 7,881,994 B1 * | 2/2011 | An | G06Q 40/03 705/36 R |
| 7,921,359 B2 | 4/2011 | Friebel | |
| 7,941,363 B2 | 5/2011 | Tanaka et al. | |
| 7,941,425 B2 | 5/2011 | Sahu et al. | |
| 7,970,676 B2 | 6/2011 | Feinstein | |
| 7,987,177 B2 | 7/2011 | Beyer et al. | |
| 7,996,392 B2 | 8/2011 | Liao et al. | |
| 8,078,524 B2 | 12/2011 | Crawford et al. | |
| 8,086,523 B1 | 12/2011 | Palmer | |
| 8,166,000 B2 | 4/2012 | Labrie et al. | |
| 8,200,511 B2 | 6/2012 | Zizzamia et al. | |
| 8,219,500 B2 | 7/2012 | Galbreath et al. | |
| 8,280,805 B1 | 10/2012 | Abrahams | |
| 8,311,960 B1 * | 11/2012 | Ginzburg | G06N 5/022 706/13 |
| 8,335,741 B2 | 12/2012 | Kornegay et al. | |
| 8,396,789 B1 * | 3/2013 | Sudjianto | G06Q 40/03 705/38 |
| 8,442,886 B1 | 5/2013 | Haggerty et al. | |
| 8,452,699 B2 | 5/2013 | Crooks | |
| 8,515,842 B2 | 8/2013 | Papadimitriou | |
| 8,554,756 B2 | 10/2013 | Gemmell et al. | |
| 8,560,436 B2 | 10/2013 | Lau et al. | |
| 8,600,966 B2 | 12/2013 | Kravcik | |
| 8,626,645 B1 | 1/2014 | Lazerson | |
| 8,645,417 B2 | 2/2014 | Groeneveld et al. | |
| 8,660,943 B1 | 2/2014 | Chirehdast | |
| 8,694,401 B2 | 4/2014 | Stewart | |
| 8,744,946 B2 | 6/2014 | Shelton | |
| 8,799,150 B2 | 8/2014 | Annappindi | |
| 9,047,392 B2 | 6/2015 | Wilkes et al. | |
| 9,268,850 B2 | 2/2016 | El-Charif et al. | |
| 9,405,835 B2 | 8/2016 | Wheeler et al. | |
| 9,501,749 B1 | 11/2016 | Ilya | |
| 9,639,805 B1 | 5/2017 | Feller | |
| 9,686,863 B2 | 6/2017 | Chung et al. | |
| 10,121,115 B2 | 11/2018 | Chrapko | |
| 10,581,887 B1 | 3/2020 | Dinerstein | |
| 10,684,598 B1 | 6/2020 | Alanqar | |
| 10,719,301 B1 | 7/2020 | Dasgupta | |
| 10,824,959 B1 | 11/2020 | Chatterjee | |
| 10,977,558 B2 | 4/2021 | Herbster | |
| 11,296,971 B1 | 4/2022 | Jain | |
| 2002/0038277 A1 | 3/2002 | Yuan | |
| 2002/0091650 A1 | 7/2002 | Ellis | |
| 2002/0138414 A1 | 9/2002 | Pitman | |
| 2002/0178113 A1 | 11/2002 | Clifford et al. | |
| 2003/0009369 A1 | 1/2003 | Gorenstein | |
| 2003/0033242 A1 | 2/2003 | Lynch et al. | |
| 2003/0033587 A1 | 2/2003 | Ferguson | |
| 2003/0046223 A1 | 3/2003 | Crawford et al. | |
| 2003/0101080 A1 * | 5/2003 | Zizzamia | G06F 17/18 705/4 |
| 2003/0147558 A1 | 8/2003 | Loui | |
| 2003/0176931 A1 | 9/2003 | Pednault et al. | |
| 2004/0068509 A1 | 4/2004 | Garden et al. | |
| 2004/0107161 A1 | 6/2004 | Tanaka et al. | |
| 2004/0199456 A1 | 10/2004 | Flint et al. | |
| 2005/0055296 A1 | 3/2005 | Hattersley et al. | |
| 2005/0114279 A1 | 5/2005 | Scarborough | |
| 2005/0234762 A1 | 10/2005 | Pinto | |
| 2005/0278246 A1 | 12/2005 | Friedman et al. | |
| 2006/0047613 A1 | 3/2006 | Labreuche | |
| 2006/0083214 A1 | 4/2006 | Grim, III | |
| 2006/0106570 A1 | 5/2006 | Feldman | |
| 2006/0112039 A1 | 5/2006 | Wang | |
| 2006/0167654 A1 | 7/2006 | Keinan | |
| 2006/0200396 A1 | 9/2006 | Satterfield et al. | |
| 2006/0218067 A1 | 9/2006 | Steele | |
| 2007/0005313 A1 | 1/2007 | Sevastyanov | |
| 2007/0011175 A1 | 1/2007 | Langseth | |
| 2007/0016542 A1 | 1/2007 | Rosauer et al. | |
| 2007/0050286 A1 | 3/2007 | Abrahams | |
| 2007/0055619 A1 | 3/2007 | Abrahams | |
| 2007/0067284 A1 | 3/2007 | Meyerzon et al. | |
| 2007/0106550 A1 | 5/2007 | Umblijs et al. | |
| 2007/0112668 A1 | 5/2007 | Celano et al. | |
| 2007/0124236 A1 | 5/2007 | Grichnik et al. | |
| 2007/0288338 A1 | 12/2007 | Hoadley et al. | |
| 2008/0133402 A1 | 6/2008 | Kurian et al. | |
| 2008/0154809 A1 * | 6/2008 | Stockwell | G06N 3/126 706/13 |
| 2008/0208820 A1 | 8/2008 | Usey et al. | |
| 2008/0222061 A1 * | 9/2008 | Soetjahja | G06N 3/126 706/13 |
| 2008/0306893 A1 | 12/2008 | Saidi | |
| 2008/0307006 A1 | 12/2008 | Lee | |
| 2009/0006283 A1 | 1/2009 | Labrie et al. | |
| 2009/0006356 A1 | 1/2009 | Liao et al. | |
| 2009/0015433 A1 | 1/2009 | James | |
| 2009/0024517 A1 | 1/2009 | Crooks | |
| 2009/0030888 A1 | 1/2009 | Sahu et al. | |
| 2009/0037308 A1 | 2/2009 | Feinstein | |
| 2009/0037321 A1 * | 2/2009 | Daniels | G06Q 40/03 705/38 |
| 2009/0192980 A1 | 7/2009 | Beyer et al. | |
| 2009/0216748 A1 | 8/2009 | Kravcik | |
| 2009/0254572 A1 | 10/2009 | Redlich | |
| 2009/0299911 A1 | 12/2009 | Abrahams | |
| 2009/0319521 A1 | 12/2009 | Groeneveld et al. | |
| 2010/0005018 A1 | 1/2010 | Tidwell | |
| 2010/0010878 A1 | 1/2010 | Pinto et al. | |
| 2010/0010935 A1 | 1/2010 | Shelton | |
| 2010/0082476 A1 | 4/2010 | Bowman | |
| 2010/0257459 A1 | 10/2010 | Galbreath et al. | |
| 2010/0325067 A1 | 12/2010 | Cagan et al. | |
| 2011/0071969 A1 | 3/2011 | Doctor | |
| 2011/0078073 A1 | 3/2011 | Annappindi | |
| 2011/0112957 A1 | 5/2011 | Ingram et al. | |
| 2011/0161263 A1 | 6/2011 | Lee | |
| 2011/0173116 A1 | 7/2011 | Yan et al. | |
| 2011/0178902 A1 | 7/2011 | Imrey | |
| 2011/0184941 A1 | 7/2011 | El-Charif et al. | |
| 2011/0270779 A1 * | 11/2011 | Showalter | G06Q 40/02 705/36 R |
| 2011/0320423 A1 | 12/2011 | Gemmell et al. | |
| 2012/0053951 A1 | 3/2012 | Kowalchuk et al. | |
| 2012/0059819 A1 | 3/2012 | Wheeler et al. | |
| 2012/0066106 A1 | 3/2012 | Papadimitriou | |
| 2012/0066116 A1 | 3/2012 | Kornegay et al. | |
| 2012/0072029 A1 | 3/2012 | Persaud et al. | |
| 2012/0082476 A1 | 4/2012 | Ito et al. | |
| 2012/0239613 A1 * | 9/2012 | Danciu | G06Q 10/06 707/603 |
| 2013/0091050 A1 | 4/2013 | Merrill | |
| 2013/0103569 A1 | 4/2013 | Gopinathan et al. | |

(56) References Cited

U.S. PATENT DOCUMENTS

| | | | |
|---|---|---|---|
| 2013/0138553 A1* | 5/2013 | Nikankin | G06Q 40/02 705/38 |
| 2013/0185189 A1 | 7/2013 | Stewart | |
| 2014/0012794 A1 | 1/2014 | Dillon | |
| 2014/0014047 A1 | 1/2014 | Garcia et al. | |
| 2014/0025872 A1 | 1/2014 | Flynn | |
| 2014/0052604 A9 | 2/2014 | Stewart | |
| 2014/0081832 A1 | 3/2014 | Merrill et al. | |
| 2014/0108665 A1 | 4/2014 | Arora | |
| 2014/0122355 A1 | 5/2014 | Hardtke et al. | |
| 2014/0149177 A1 | 5/2014 | Frank et al. | |
| 2014/0172886 A1 | 6/2014 | Wilkes et al. | |
| 2014/0180790 A1 | 6/2014 | Boal | |
| 2014/0181267 A1 | 6/2014 | Wadkins | |
| 2014/0310661 A1 | 10/2014 | Frederickson | |
| 2014/0310681 A1 | 10/2014 | Poozhiyil | |
| 2015/0019912 A1 | 1/2015 | Darling | |
| 2015/0056229 A1 | 2/2015 | Nandy et al. | |
| 2015/0081602 A1 | 3/2015 | Talley | |
| 2015/0161098 A1 | 6/2015 | Granshaw | |
| 2015/0213361 A1 | 7/2015 | Gamon | |
| 2015/0317337 A1 | 11/2015 | Edgar | |
| 2015/0347485 A1 | 12/2015 | Cai | |
| 2015/0379428 A1 | 12/2015 | Dirac | |
| 2016/0042292 A1 | 2/2016 | Caplan | |
| 2016/0088723 A1 | 3/2016 | Chung et al. | |
| 2016/0110353 A1 | 4/2016 | Merrill et al. | |
| 2016/0132787 A1 | 5/2016 | Drevo | |
| 2016/0300252 A1 | 10/2016 | Frank | |
| 2016/0371238 A1 | 12/2016 | Heavenrich | |
| 2017/0061326 A1 | 3/2017 | Talathi | |
| 2017/0109657 A1 | 4/2017 | Marcu | |
| 2017/0124464 A1 | 5/2017 | Crabtree | |
| 2017/0140518 A1 | 5/2017 | Liang | |
| 2017/0220633 A1 | 8/2017 | Porath | |
| 2017/0222960 A1 | 8/2017 | Agarwal | |
| 2017/0316311 A1 | 11/2017 | Pilly | |
| 2017/0330058 A1 | 11/2017 | Silberman | |
| 2018/0018578 A1 | 1/2018 | Yoshizumi | |
| 2018/0025273 A1 | 1/2018 | Jordan | |
| 2018/0060738 A1 | 3/2018 | Achin | |
| 2018/0068219 A1 | 3/2018 | Turner | |
| 2018/0268262 A1 | 9/2018 | Osada | |
| 2018/0293712 A1 | 10/2018 | Vogels | |
| 2018/0322406 A1 | 11/2018 | Merrill | |
| 2018/0349986 A1 | 12/2018 | Fidanza | |
| 2019/0042887 A1 | 2/2019 | Nguyen | |
| 2019/0043070 A1 | 2/2019 | Merrill | |
| 2019/0114704 A1 | 4/2019 | Way | |
| 2019/0228006 A1 | 7/2019 | Tormasov | |
| 2019/0244122 A1 | 8/2019 | Li | |
| 2019/0279111 A1 | 9/2019 | Merrill | |
| 2019/0287025 A1 | 9/2019 | Perez | |
| 2019/0303404 A1 | 10/2019 | Amer | |
| 2019/0311298 A1 | 10/2019 | Kopp | |
| 2019/0318202 A1 | 10/2019 | Zhao | |
| 2019/0318421 A1 | 10/2019 | Lyonnet | |
| 2019/0325514 A1 | 10/2019 | Hong | |
| 2019/0340518 A1 | 11/2019 | Merrill | |
| 2019/0340684 A1 | 11/2019 | Belanger | |
| 2019/0354806 A1 | 11/2019 | Chhabra | |
| 2019/0354853 A1 | 11/2019 | Zoldi | |
| 2019/0378210 A1 | 12/2019 | Merrill | |
| 2020/0005136 A1 | 1/2020 | Spryn | |
| 2020/0012917 A1 | 1/2020 | Pham | |
| 2020/0082299 A1 | 3/2020 | Vasconcelos | |
| 2020/0160177 A1 | 5/2020 | Durand | |
| 2020/0175586 A1 | 6/2020 | McKenna | |
| 2020/0183047 A1 | 6/2020 | Denli | |
| 2020/0231466 A1 | 7/2020 | Lu | |
| 2020/0242492 A1 | 7/2020 | Goel | |
| 2020/0257927 A1 | 8/2020 | Nomi | |
| 2020/0257961 A1 | 8/2020 | Hua | |
| 2021/0019603 A1 | 1/2021 | Friedman | |
| 2021/0133631 A1 | 5/2021 | Prendki | |
| 2021/0209688 A1 | 7/2021 | Krishnamurthy | |
| 2021/0224605 A1 | 7/2021 | Zhang | |
| 2021/0256392 A1 | 8/2021 | Zhengzhang | |
| 2021/0281491 A1 | 9/2021 | Yelahanka Raghuprasad | |
| 2021/0406815 A1 | 12/2021 | Mimassi | |
| 2022/0019741 A1 | 1/2022 | Roy | |
| 2022/0122171 A1 | 4/2022 | Hubard | |
| 2022/0188519 A1 | 6/2022 | Briody | |
| 2022/0188568 A1 | 6/2022 | Singh | |
| 2022/0191332 A1 | 6/2022 | Ahmadi | |

FOREIGN PATENT DOCUMENTS

| | | |
|---|---|---|
| WO | 2014014047 A1 | 1/2014 |
| WO | 2014055238 A1 | 4/2014 |
| WO | 2014121019 A1 | 8/2014 |
| WO | 2014184381 A2 | 11/2014 |
| WO | 2015056229 A1 | 4/2015 |
| WO | 2015081160 A1 | 6/2015 |
| WO | 2019028179 A1 | 2/2019 |

OTHER PUBLICATIONS

Wikipedia Search, "Bit Array", May 5, 2021 at:: https://en.wikipedia.org/wiki/Bit_array.*

Liu et al., "Genetic Algorithm-based Feature Selectionmethod for Credit Risk Analysis," 2nd International Conference on Computer Science and Network Technology, 2012 (Year: 2012).*

Shulin et al., "Neural Networks Based on Evolutional Algorithm for Residential Loan," IEEE, 978-1-4244-1743-6/08 2008 (Year: 2008).*

Figurska et al., "Humans cannot consciously generate a random numbers sequence: Polemic study," Elsevier, Medical Hypotheses 70, 182-185 2008 (Year: 2008).*

Strobl, Carolin , et al., "Conditional Variable Importance for Random Forests", BMC Bioinformatics 2008, 9:307, published Jul. 11, 2008.

"Gehrlein, William et al., A two-stage least cost credit scoring model, 1997, Annals of Operations Research, pp. 159-171.", Jul. 15, 2016 00:00:00.0.

"Feature Selection", Wikipedia and obtained in the Wayback machine at URL http://en.wikipedia.org/wiki/Feature_selection, Sep. 1, 2011.

"Feature Selection", Wikipedia and obtained in the Wayback machine at URL https://en.wikipedia.org/wiki/Feature_selection, Feb. 25, 2021.

Bittencourt, H.R. , et al., "Feature Selection by Using Classification and Regression Trees (CART)", dated Aug. 23, 2004.

Tuv, Eugene , et al., "Feature Selection with Ensembles, Artificial Variables, and Redundancy Elimination", Journal of Machine Learning Research, pp. 1341-1366, Jul. 2009.

Office Action (Notice of Allowance and Fees Due (PTOL-85)) dated Nov. 19, 2021 for U.S. Appl. No. 16/292,844 (pp. 1-8).

Ribeiro, Marco Tulio et al., Why Should | Trust You?—Explaining Predictions of Any Classifier ACM, 2016 (Year: 2016).

Richardson, L. F. , "The approximate arithmetical solution by finite differences of physical problems including differential equations, with an application to the stresses in a masonry dam", Philosophical Transactions of the Royal Society A. 210 (459-470): 307-357. doi:10.1098/rsta.1911.0009, Nov. 2, 1909.

Richardson, L. F., "The deferred approach to the limit", Philosophical Transactions of the Royal Society A. 226 (636-646): 299-349. doi:10.1098/rsta.1927.0008, Oct. 14, 1926.

Rumelhart, David E., et al., "Learning representations by back-propagating errors", Nature vol. 323, Oct. 9, 1986.

Saabas, Ando , "Diving into data, a blog on machine learning, data mining and visualization, Interpreting random forests", http://blog.datadive.net/interpreting-random-forests/ (spec), Oct. 19, 2014.

Saabas, Ando , "Diving into data, a blog on machine learning, data mining and visualization, Random forest interpretation with scikit-learn", http://blog.datadive.net/random-forest-interpretation-with-scikit-learn/ (spec), Aug. 12, 2015.

Saabas, Ando , "Diving into data, a blog on machine learning, data mining and visualization, Random forest interpretation—

(56) References Cited

OTHER PUBLICATIONS conditional feature contributions", http://blog.datadive.net/random-forest-interpretation-conditional-feature-contributions/ (spec), Oct. 26, 2016.
Shapley, L. S., "A Value for n-Person Games", p. 295, The Rand Corporation, Mar. 18, 1952.
Strumbelj, Eric, et al., "An Efficient Explanation of Individual Classifications using Game Theory", Journal of Machine Learning Research 11 (2010) 1-18.
Sundararajan, Mukund, et al., "Axiomatic Attribution for Deep Networks", Proceeding of the 34th International Conference on Machine Learning, Sydney, Australia, PMLR 70, Jun. 13, 2017.
Tonk, Stijn, "Towards fairness in ML with adversarial networks", http://godatadriven.com/, Apr. 27, 2019.
Ward, et al., "An exploration of the influence of path choice in game-theoretic attribuution algorithms," Journal of Machine Learning Research Under Review (2020), 21 pages.
Wattenber, Martin et al., Attacking discrimination with smarter machine learning Google Research, 2016 (Year: 2016).
Wikipedia entry on "Autoencoder". https://en.wikipedia.org/wiki/Autoencoder Downloaded Jun. 15, 2022 (Year: 2022).
Wolpert, David H., "Stacked Generalization", Original contribution: Stacked generalization. Neural Netw., 5(2):241 259, Feb. 1992.
ZestFinance releases new software tool to reduce bias in AI-powered credit scoring models: New fairness filter can put 170,000 more minority families into homes. (Mar. 19, 2019). PR Newswire Retrieved from https://dialog.proquest.com/professional/docview/2193594346?accountid=131444 (Year: 2019).
Zhang, et al., 2018. "Mitigating Unwanted Biases with Adversarial Learning," In Proceedings of the 2018 AAAI/ACM Conference on AI, Ethics, and Society (AIES '18). Association for Computing Machinery, New York, NY, USA, 335-340.
Zhao, Zheng, et al., "On Similarity Preserving Feature Selection", IEEE Transactions on Knowledge and Data Engineering 25,2011, pp. 619-632.
Bean, D.M., Wu, H., Igbal, E., Dzahini, O., Ibrahim, Z.M., Broadbent, M., Stewart, R. and Dobson, R.J., 2017. Knowledge graph prediction of unknown adverse drug reactions and validation in electronic health records. Scientific reports, 7(1), pp. 1-11.
Office Action (Final Rejection) dated Aug. 16, 2022 for U.S. Appl. No. 15/977,105 (pp. 1-17).
Office Action (Non-Final Rejection) dated Aug. 26, 2022 for U.S. Appl. No. 16/394,651 (pp. 1-8).
Office Action (Non-Final Rejection) dated Sep. 15, 2022 for U.S. Appl. No. 17/535,511 (pp. 1-11).
Office Action (Non-Final Rejection) dated Sep. 22, 2022 for U.S. Appl. No. 17/223,698 (pp. 1-8).
Zhao, Q., Li, Q. and Wen, J., 2018. Construction and application research of knowledge graph in aviation risk field. In MATEC Web of Conferences (vol. 151, p. 05003). EDP Sciences.
International Search Report and the Written Opinion, Application No. PCT/US14/014047, dated May 5, 2014.
"On the Convergence of Generalized Hill Climbing Algorithms" by A.W. Johnson et al. copyright 2002, Elsevier Science B.V., Discrete Applied Mathematics (Year: 2002).
"International Search Report and Written Opinion of the ISA, dated Sep. 16, 2019, for application No. PCT/US19/029148."
Abadi, Martin, et al., "TensorFlow: Large-Scale Machine Learning on Heterogeneous Distributed Systems", Preliminary White Paper, Nov. 9, 2015.
Boris Sharchilev et al: "Finding Influential Training Samples for Gradient Boosted Decision Trees", arxiv.org, Cornell University Library, 201 Olin Library Cornell University Ithaca, NY 14853, Feb. 19, 2018 (Feb. 19, 2018), XP081223129, 10 pages.
Breiman, Leo, et al., "Random Forests", Machine Learning, 45, 5-32, 2001.
Chen, Jiahao, Fair lending needs explainable models for responsible recommendation Proceedings of the Second Workshop on Responsible Recommendation, 2018 (Year: 2018).
Chen, Tianqi, et al., "XGBoost: A Scalable Tree Boosting System", KDD '16, Aug. 13-17, 2016, San Francisco, CA, USA.
Cortes, Corinna, et al., "Support-Vector Networks", AT&T Labs—Research, USA, Journal Machine Learning, vol. 20, Issue 3, Sep. 1995.
Data Bias and Algorithmic Discrimination University of Montreal, 2017 (Year: 2017).
Demaine, Erik D., et al., "Correlation clustering in general weighted graphs", Theorectical Computer Science 361 (2006)172-187.
European Extended Search Report issued in EP19764112.9, dated Jun. 27, 2022, 11 pages.
European Extended Search Report issued in EP19764112.9, dated Mar. 24, 2022, 14 pages.
Friedman, Jerome H., "Greedy Function Approximation: A Gradient Boosting Machine", IMS 1999 Reitz Lecture, Feb. 24, 1999.
Garcia-Pedradas, Nicolas, et al., "Nonlinear Boosting Projections for Ensemble Contruction", Journal of Machine earning Research 8 (2007) 1-33.
Gates, Susan Wharton et al., 4/3 Automated Underwriting: Friend or Foe to Low-Mod Households and Neighborhoods? Building Assets, Building Credit, Symposium, Nov. 2003 (Year: 2003).
Geurts, Pierre, et al., "Extremely randomized trees", Springer Science + Business Media, Inc., rec'd Jun. 14, 2005, pub. online Mar. 2, 2006.
International Preliminary Report on Patentability issued in PCT/US2013/060208, dated Mar. 24, 2015, 8 pages.
International Search Report and Written Opinion for Application No. PCT/US18/44874, mailed Oct. 10, 2018.
International Search Report and Written Opinion for application No. PCT/US20/062235, dated Mar. 10, 2021.
International Search Report and Written Opinion for application No. PCT/US20/062271 dated Feb. 26, 2021.
International Search Report and Written Opinion for International Application No. PCT/US18/030966, dated Jul. 20, 2018.
International Search Report and Written Opinion issued in PCT/US2020/062235, dated Mar. 10, 2021, 8 pages.
International Search Report and Written Opinion issued in PCT/US2020/062271, dated Feb. 26, 2021, 8 pages.
International Search Report and Written Opinion of the ISA for application No. PCT/20/23370 dated Jun. 18, 2020.
International Search Report and Written Opinion of the ISA, dated Jul. 5, 2019, for application No. PCT/US19/021381.
International Search Report and Written Opinion of the ISA, dated Aug. 23, 2019, for application No. PCT/US19/036049.
International Search Report issued in PCT/US2013/060208, dated Jan. 7, 2014, 2 pages.
Ivanov, Alexei, et al., "Kolmogorov-Smirnov test for feature selection in emotion recognition from speech", IEEE International Conference on acoustics, speech and signal processing (ICASSP), 2012, pp. 5125-5128.
Johnson, Kristen, et al., "Artificial Intelligence, Machine Learning, and Bias in Finance: Toward Responsible Innovation", Fordham Law Review, vol. **, Issue 2, Article 5,2019, pp. 499-529.
Kamkar, Sean Javad, "Mesh Adaption Strategies for Vortex-Dominated Flows", Standard University, Feb. 2011.
Kang et al., "A novel credit scoring framework for auto loan using an imbalanced-learning-based reject inference". 2019 IEEE Conference on Computational Intelligence for Financial Engineering & Economics (CIFEr). May 4-5, 2019. DOI: 10.1109/CIFEr 2019. 8759110, 8 pages (Year: 2019).
Lippert, John, "ZestFinance Issues small, high-rate loans, uses big data to weed out deadbeats", The Washington Post, Oct. 12, 2014.
Louppe, Gilles, et al., "Learning to Pivot with Adversarial Networks", 31st Conference on Neural Information Processing Systems (NIPS 2017), Long Beach, CA, USA, https://papers.nips.cc/paper/6699-learning-to-pivot-with-adversarial-networks.pdf.
Lundberg, Scott M., et al., "A Unified Approach to Interpreting Model Predictions", 31st Conference on Neural Information Processing Systems (NIPS 2017), Long Beach, CA, USA, Nov. 25, 2017.
Lundberg, Scott M., et al., "Consistent Individualized Feature Attribution for Tree Ensembles", University of Washington, Mar. 7, 2019.

(56) References Cited

OTHER PUBLICATIONS

Marco Ancona et al: "Towards better understanding of gradient-based attribution methods for Deep Neural Networks", arxiv.org, Cornell University Library, 201 Olin Library Cornell University Ithaca, NY 14853, Mar. 7, 2018 (Mar. 7, 2018), XP081506780, 16 pages.
Merrill, Douglas C, et al., "Systems and Methods for Decomposition of Non-Differentiable and Differentiable Models", U.S. Appl. No. 16/434,731, filed Jun. 7, 2019.
Merrill, Douglas C, et al., "Systems and Methods for Enriching Modeling Tools and Infrastructure with Semantics", U.S. Appl. No. 16/394,651, filed Apr. 25, 2019.
Merrill, John W. L. , et al., "Generalized Integrated Gradients: A practical method for explaining diverse ensembles", Journal of Machine Learning Research Under Review (2019), 29 pages.
Modarres, Ceena , et al., "Towards Explainable Deep Learning for Credit Lending: A Case Study", arXiv:1811.06471v2 [cs.LG], Nov. 30, 2018.
Mondarres, Ceena et al., Towards Explainable Deep Learning for Credit Lending: A Case Study Proc. Workshop Challenges Opportunities AI Financial Services: Impact Fairness Explainability Accuracy Privacy (NIPS), 2018 ( Year: 2018).
Mukund Sundararajan et al: "Axiomatic Attribution for Deep Networks", arxiv.org, Cornell University Library, 201 Olin Library Cornell University Ithaca, NY 14853, Mar. 4, 2017 (Mar. 4, 2017), XP080754192, 10 pages.
Nesiba, Reynold F., "The Color of Credit: Mortgage Discrimination, Research Methodology, and Fair-Lending Enforcement", Journal of Economic Issues, 37 (3), 813-815, 2003.
Office Action (Final Rejection) dated Nov. 18, 2021 for U.S. Appl. No. 16/052,293 (pp. 1-18).
Office Action (Non-Final Rejection) dated Mar. 2, 2022 for U.S. Appl. No. 16/434,731 (pp. 1-6).
Office Action (Non-Final Rejection) dated May 24, 2022 for U.S. Appl. No. 16/688,789 (pp. 1-17).
Office Action (Non-Final Rejection) dated Jun. 24, 2022 for U.S. Appl. No. 17/385,452 (pp. 1-14).
Office Action (Non-Final Rejection) dated Aug. 1, 2022 for U.S. Appl. No. 16/052,293 (pp. 1-15).
Office Action (Non-Final Rejection) dated Dec. 16, 2021 for U.S. Appl. No. 15/977,105 (pp. 1-19).
Dong Yue et al, "Threaded ensembles of autoencoders for stream learning : Neural Networks for Stream Learning", Computational Intelligence, vol. 34, No. 1, doi:10.1111/coin.12146, ISSN 0824-7935, (Feb. 1, 2018), pp. 261-281, URL: https://api.wiley.com/onlinelibrary/tdm/v1/articles/10.1111%2Fcoin.12146, XP055925516 (Absract).
European Extended Search Report issued in EP19796824.1, dated Jun. 13, 2022, 9 pages.
International Preliminary Report on Patentability in International Appln. No. PCT/US2019/029148, dated Nov. 19, 2020, 6 pages.
Li, Hongxiang, et al. "A novel method for credit scoring based on feature transformation and ensemble model." PeerJ Computer Science 7 (2021): e579. 19 pages.
Office Action (Final Rejection) dated Dec. 7, 2022 for U.S. Appl. No. 16/688,789 (pp. 1-24).
Office Action (Non-Final Rejection) dated Oct. 28, 2022 for U.S. Appl. No. 17/389,789 (pp. 1-19).
Office Action (Non-Final Rejection) dated Dec. 8, 2022 for U.S. Appl. No. 17/147,025 (pp. 1-20).
Wei Min et al, "Behavior Language Processing with Graph based Feature Generation for Fraud Detection in Online Lending Behavior Language Processing with Graph based Feature Generation for Fraud Detection in Online Lending", Proceedings of WSDM workshop on Misinformation and Misbehavior Mining on the Web, (Jan. 1, 2018), URL: https://web.archive.org/web/20180329125033if_/http://snap.stanford.edu:80/mis2/files/MIS2_paper_26.pdf, (Aug. 7, 2019), XP055611538, 8 pages.

* cited by examiner (a) Single exemplar with associated exchange score

ADVERSE ACTION SYSTEMS AND METHODS FOR COMMUNICATING ADVERSE ACTION NOTIFICATIONS FOR PROCESSING SYSTEMS USING DIFFERENT ENSEMBLE MODULES

CROSS-REFERENCE TO RELATED APPLICATIONS

This application is a continuation application of U.S. patent application Ser. No. 14/954,825, filed 30 Nov. 2018, which is a continuation application of U.S. patent application Ser. No. 14/169,400, filed Jan. 31, 2014, which claims priority to U.S. Provisional Application No. 61/759,081, all of which are hereby incorporated in their entirety by reference. This application also relates to U.S. application Ser. No. 13/454,970, filed Apr. 24, 2012, which is also hereby incorporated in its entirety by reference.

TECHNICAL FIELD

This invention relates generally to the personal finance and banking field, and more particularly to the field of lending and credit notification methods and systems.

BACKGROUND AND SUMMARY

People use credit daily for purchases large and small. Lenders, such as banks and credit card companies, use "credit scores" to evaluate the potential risk posed by lending money. These measures purport to determine the likelihood that a person will pay his or her debts.

But credit scoring systems are a recent innovation. In the 1950's and 1960's, credit decisions were made by bank credit officials, who knew the applicant. Since applicants usually lived in the same town, credit officers would make subjective decisions based on their knowledge of the applicant. Then, in the 1970's, the advent of "FICO scores" made credit far more available, effectively removing the credit officer from the process. As the idea of using statistical computations to measure risk caught on, lenders began using a variety of other credit scoring methods and models. Examples include simple systems (such as those offered by Experian, Equifax, TransUnion) and advanced models with many traditional and non-traditional variables, and many thousands of meta-variables, such as those described by the Applicant in U.S. application Ser. No. 13/454,970 and its related continuations.

As a result of decreased physical interaction with lenders and increased computational complexity of calculating "creditworthiness," consumers' visibility into what "drives" their credit scores diminished.

In response, laws such as the Consumer Credit Protection Act and Federal Equal Credit Opportunity Act, were designed, in part, to ensure that borrowers are not denied loans for discriminatory purposes. They were also designed, in part, to educate consumers as to the reasons why they were denied loans.

Federal and some state laws require lenders send "adverse action letters" to denied applicants explaining the reasons for those decisions. Theoretically, the letter should also allow an opportunity for the borrower to determine (1) if there is an error in his or her records which has led to the denial of credit; as well as (2) provide the borrower with information that helps identify which part(s) of his/her credit history is problematic.

But lenders engage in only minimal compliance, often providing generic reasons for their decisions. Unfortunately, these adverse action letters do very little to actually help consumers verify their credit history and/or determine which actions could increase their creditworthiness (at least, insofar as these mathematical models are concerned). This outcome is not beneficial from a lending policy standpoint as customers aren't getting what they need.

However, generating adverse actions letters that provide useful consumer feedback is not a straightforward task. Describing market factors as a reason for denials, in and of itself, is a complex job. But when compounded with the complexity of the newer mathematical credit scoring models, the job of effectively communicating the reasons is far more challenging. Indeed, pinpointing one or more variables—jointly or severally—that correlate to increased credit scores involves a complex analysis that few lenders, if any, would bother to perform, much less communicate to their consumers.

Accordingly, improved systems and methods for generating high quality adverse action letters would be desirable.

SUMMARY OF THE INVENTION

To improve upon existing systems, preferred embodiments of the present invention provide a system and method for automatically generating high quality adverse action notifications. One preferred method for automatically generating high quality adverse action notifications can include entering and/or importing a borrower dataset and a lender's credit criteria at a first computer (borrower data and lender criteria); processing the dataset variables and/or sets of variables in the lender's algorithms to identify which variables, when changed, result in an increased credit score (field selection); ranking individual variables and/or sets of variables in the borrower dataset to yield the greatest differences in a credit score (field ranking); and generating a report showing which variables and/or sets of variables, when changed, result in an acceptable credit score (reason test generation). As described below, the preferred method can further include formatting the reason set generation into an adverse action letter that is understandable and usable by the consumer (adverse action letter generation). Other variations, features, and aspects of the system and method of the preferred embodiment are described in detail below with reference to the appended drawings.

The present invention could be used independently (by simply generating adverse action letters) or in the alternative, the present invention could also be interfaced with, and used in conjunction with, a system and method for providing credit to borrowers. An example of such systems and methods is described in U.S. patent application Ser. No. 13/454, 970, entitled "System and Method for Providing Credit to Underserved Borrowers, to Douglas Merrill et al, which is hereby incorporated by reference in its entirety ("Merrill Application").

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

In order to better appreciate how the above-recited and other advantages and objects of the inventions are obtained, a more particular description of the embodiments briefly described above will be rendered by reference to specific embodiments thereof, which are illustrated in the accompanying drawings. It should be noted that the components in the figures are not necessarily to scale, emphasis instead being placed upon illustrating the principles of the invention. Moreover, in the figures, like reference numerals designate corresponding parts throughout the different views. However, like parts do not always have like reference numerals. Moreover, all illustrations are intended to convey concepts, where relative sizes, shapes and other detailed attributes may be illustrated schematically rather than literally or precisely.

DEFINITIONS

The following definitions are not intended to alter the plain and ordinary meaning of the terms below but are instead intended to aid the reader in explaining the inventive concepts below:

As used herein, the term "BORROWER DEVICE" shall generally refer to a desktop computer, laptop computer, notebook computer, tablet computer, mobile device such as a smart phone or personal digital assistant, smart TV, gaming console, streaming video player, or any other, suitable networking device having a web browser or stand-alone application configured to interface with and/or receive any or all data to/from the CENTRAL COMPUTER, USER DEVICE, and/or one or more components of the preferred system 10.

As used herein, the term "USER DEVICE" shall generally refer to a desktop computer, laptop computer, notebook computer, tablet computer, mobile device such as a smart phone or personal digital assistant, smart TV, gaming console, streaming video player, or any other, suitable networking device having a web browser or stand-alone application configured to interface with and/or receive any or all data to/from the CENTRAL COMPUTER, BORROWER DEVICE, and/or one or more components of the preferred system 10.

Figure 1:
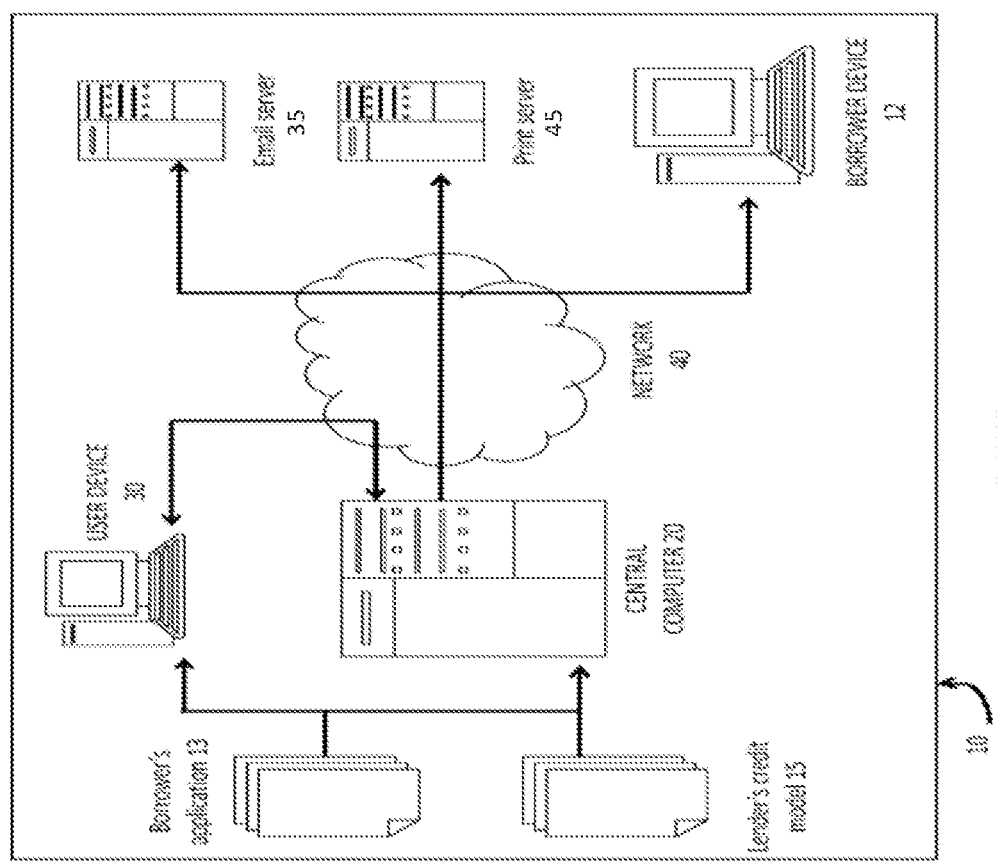
FIG. 1 is a diagram of a system for automatically generating high quality adverse action notifications in accordance with a preferred embodiment of the present invention.

As used herein, the term "CENTRAL COMPUTER" shall generally refer to one or more sub-components or machines configured for receiving, manipulating, configuring, analyzing, synthesizing, communicating, and/or processing data associated with the borrower and lender. Any of the foregoing subcomponents or machines can optionally be integrated into a single operating unit, or distributed throughout multiple hardware entities through networked or cloud-based resources. Moreover, the central computer may be configured to interface with and/or receive any or all data to/from the USER DEVICE, BORROWER DEVICE, and/or one or more components of the preferred system 10 as shown in FIG. 1. The CENTRAL COMPUTER may also be the same device described in more detail in the Merrill Application, incorporated by reference in its entirety.

As used herein, the term "BORROWER'S DATA" shall generally refer to the borrower's data in his or her application for lending as entered into by the borrower, or on the borrower's behalf, in the BORROWER DEVICE, USER DEVICE, or CENTRAL COMPUTER. By way of example, this data may include traditional credit-related information such as the borrower's social security number, driver's license number, date of birth, or other information requested by a lender. This data may also include proprietary information acquired by payment of a fee through privately or governmentally owned data stores (including without limitation, through feeds, databases, or files containing data). Alternatively, this data may include public information available on the internet, for free or at a nominal cost, through one or more search strings, automated crawls, or scrapes using any suitable searching, crawling, or scraping process, program, or protocol. Moreover, borrower data could include information related to a borrower profile and/or any blogs, posts, tweets, links, friends, likes, connections, followers, followings, pins (collectively a borrower's social graph) on a social network. The list of foregoing examples is not exhaustive.

As used herein, the term "LENDER CRITERIA" shall generally refer to the criteria by which a lender decides to accept or reject an application for credit as periodically set in the USER DEVICE or CENTRAL COMPUTER. By way of example, these criteria may include accept or reject criterion based on individual data points in the BORROWER'S DATA (such as length of current residence >6 months), or based on complex mathematical models that determine the creditworthiness of a borrower.

As used herein, the term "NETWORK" shall generally refer to any suitable combination of the global Internet, a wide area network (WAN), a local area network (LAN), and/or a near field network, as well as any suitable networking software, firmware, hardware, routers, modems, cables, transceivers, antennas, and the like. Some or all of the components of the preferred system 10 can access the network through wired or wireless means, and using any suitable communication protocol/s, layers, addresses, types of media, application programming interface/s, and/or supporting communications hardware, firmware, and/or software.

As used herein and in the claims, the singular forms "a," "an," and "the" include plural references unless the context clearly dictates otherwise.

Unless defined otherwise, all technical and scientific terms used herein have the same meanings as commonly understood by one of ordinary skill in the art.

DETAILED DESCRIPTION OF PREFERRED EMBODIMENTS

The following description of the preferred embodiments of the invention is not intended to limit the invention to these preferred embodiments, but rather to enable any person skilled in the art to make and use this invention. Although any methods, materials, and devices similar or equivalent to those described herein can be used in the practice or testing of embodiments, the preferred methods, materials, and devices are now described.

The present invention relates to improved methods and systems for automatically generating high quality adverse action notifications, which includes notifications for individuals, and other types of entities including, but not limited to, corporations, companies, small businesses, and trusts, and any other recognized financial entity.

Prior to describing the preferred system and method, a frame of reference is in order: As many consumers know, a person's credit history is made up of a number of variables, such as the amount of debt the person is presently carrying, their income stability, their repayment history on past debt (lateness or failure to pay), and the length of their credit history. However, consumers do not often appreciate that modern credit scoring systems have significantly increased in sophistication, now containing many variables and meta-variables as well.

But credit applications are typically underwritten in a fairly stereotyped fashion. First, information is gathered from an applicant, generating an application. This application is supplemented with other data relevant to the application, including publicly available data (e.g. "Does the applicant have an active lien filed against him/her?") or proprietary data (e.g. "How many credit applications has this person filed in the last 90 days?") The resulting record is provided to a "scoring system," which assigns a numerical score to the application. This score is compared to a threshold, and the applicant receives a loan if the score exceeds that threshold.

Given this process, the problem of determining the reasons for a declined application appears straightforward: simply go through the list of variables (also called "signals") used in the scoring process, and find the ones which could make the score change towards the threshold. This appearance can be deceptive.

Modern scoring functions almost never produce monotone base signals. Even scoring systems that use monotone functions such as logistic regression to produce their final outputs use intermediate meta-variables that transform primary signals into distilled signals that are no longer monotone in the values of those primary signals. As a result, knowing that a small change in a given signal locally increases the application's score for a given application gives no assurance that a large change in the same signal will necessarily still increase the application's score. In addition, since a change in a single variable might not have the same effect as a change in several variables together, it would not necessarily be enough to look at one-variable perturbations when searching for "better results."

Because detection of the underlying variables that drive an applicant's score has become exceedingly complex, in turn, intelligibly reporting the right reasons for deficiency in a person's score requires not only sophisticated analysis, but also a translation into understandable language. Indeed, it is because of this complexity that few lenders, if any, would bother to perform the analysis, much less communicate to their consumers. The preferred embodiment of the present invention solves this problem through an automated method and process for performing the analysis and intelligibly communicating the results, as further described below:

System:

As shown in FIG. 1, a preferred operating environment for automatically generating high quality adverse action notifications in accordance with a preferred embodiment can generally include data sources (the borrower's application 13, and the lender's credit model 15), a USER DEVICE 30, a CENTRAL COMPUTER 20, a NETWORK 40, and one or more communication devices from which the borrower is issued an adverse action letter, including a BORROWER DEVICE 12, Email Server 30, and/or a Print Server 40. The preferred system 10 can include at least: data sources (the borrower's application 13, and the lender's credit model 15), and a computer to analyze and process the data sources (CENTRAL COMPUTER 20 and/or a USER DEVICE 30), which function to generate high quality adverse action notifications. To be clear, the borrower's application 13 should include one or more variables in the BORROWER DATA, and the lender's credit model 15 should include one or more algorithms from the LENDER'S CRITERIA. In particular, the preferred system 10 functions to helps borrowers determine the accuracy of his/her credit file as well as provide information to improve his/her creditworthiness, by accessing, evaluating, measuring, quantifying, and utilizing a the novel and unique methodology described below.

More specifically, this invention relates to the preferred methodology for automatically generating high quality adverse action notifications that takes place within the CENTRAL COMPUTER 20 and/or a USER DEVICE 30, after gathering and/or downloading the BORROWER'S DATA 13 and the LENDER CRITERIA 15.

Figure 2:
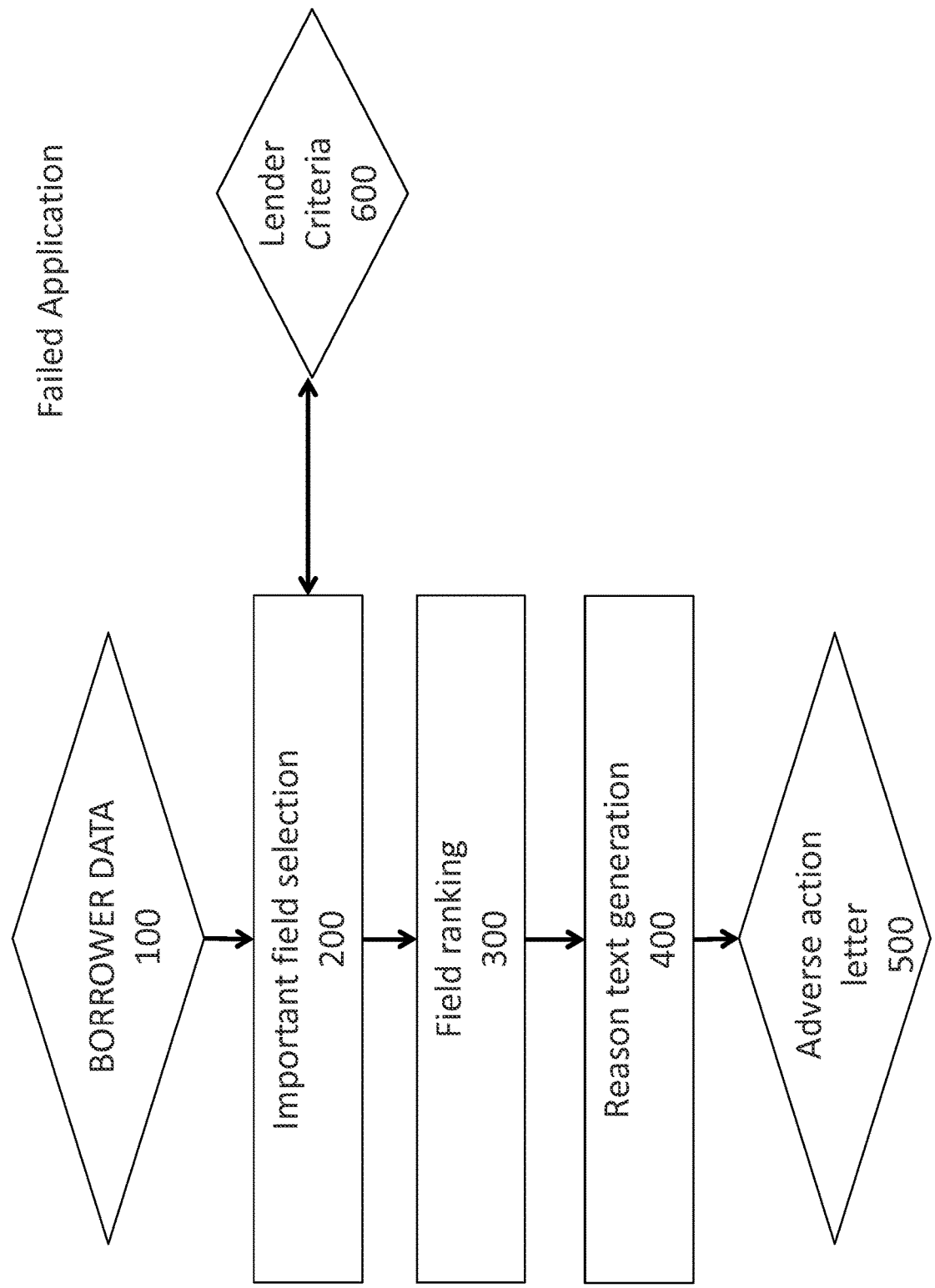
FIG. 2 depicts an overall flowchart illustrating an exemplary embodiment of a method by which high quality adverse action notifications are automatically generated.

Method:

FIG. 2 provides a flowchart illustrating one preferred method for automatically generating high quality adverse action notifications which involves the following steps: (a) gathering the BORROWER DATA 100 for a failed credit application; (b) important field selection 200 (to compare BORROWER DATA against the LENDER CRITERIA 600); (c) field ranking 300; (d) reason text generation 400; and (e) generating adverse action letters 500.

In the first step, all data from the borrower's failed application (BORROWER DATA 100) is temporarily gathered for collection by a computer (such as the CENTRAL COMPUTER 20 in FIG. 1). For example, the BORROWER DATA 100 may include classic financial data such as the borrower's current salary, length of most recent employment, and the number of bankruptcies. Additionally, the BORROWER DATA 100 may include other unique aspects of the borrower, such as the number of organizations the borrower has been or is currently is involved with, the number of friends the borrower has, or other non-traditional aspects of the borrower's identity and history such those identified in the Merrill Application. Subsets of BORROWER DATA 100 are used to determine the borrower's credit score.

For illustrative purposes, fictitious BORROWER DATA 100 for Ms. "A" (a creditworthy applicant), Mr. "B" (a declined applicant), the average approved applicant, and the perfect applicant are shown below:

| Variable | Ms. "A" | Mr. "B" | Avg. Applicant | Perfect Applicant |
|---|---|---|---|---|
| Loan Requested | $400 | $7,500 | $1,500 | <$3,000 |
| Income | $32K | $65K | $48K | $100K |
| Rent | $800/mo | $1,200/mo | $1,000/mo | $1,000/mo |
| Address Information | 2 addresses in 10 years | 7 addresses in past 5 years | 2 addresses in 5 years | 1 addresses in 5 years |

| Variable | Ms. "A" | Mr. "B" | Avg. Applicant | Perfect Applicant |
| --- | --- | --- | --- | --- |
| Late Payments | 1—gas bill. | None | <2 bills within 5 yrs. | None |
| Social Security Number | One (1) registered SSN | Four (4) registered SSN | One (1) registered SSN | One (1) registered SSN |
| Credit Score (out of 100) | 82 | 75 | >80 | 100 |

Referring back to FIG. 2, the second step is important field selection 200. Important field selection is the creation of a list of BORROWER DATA variables whose values either reduce or increase the application's credit score by sufficiently perceptible amounts when those variables are changed, and processed through the LENDER CRITERIA 600.

Figure 3:
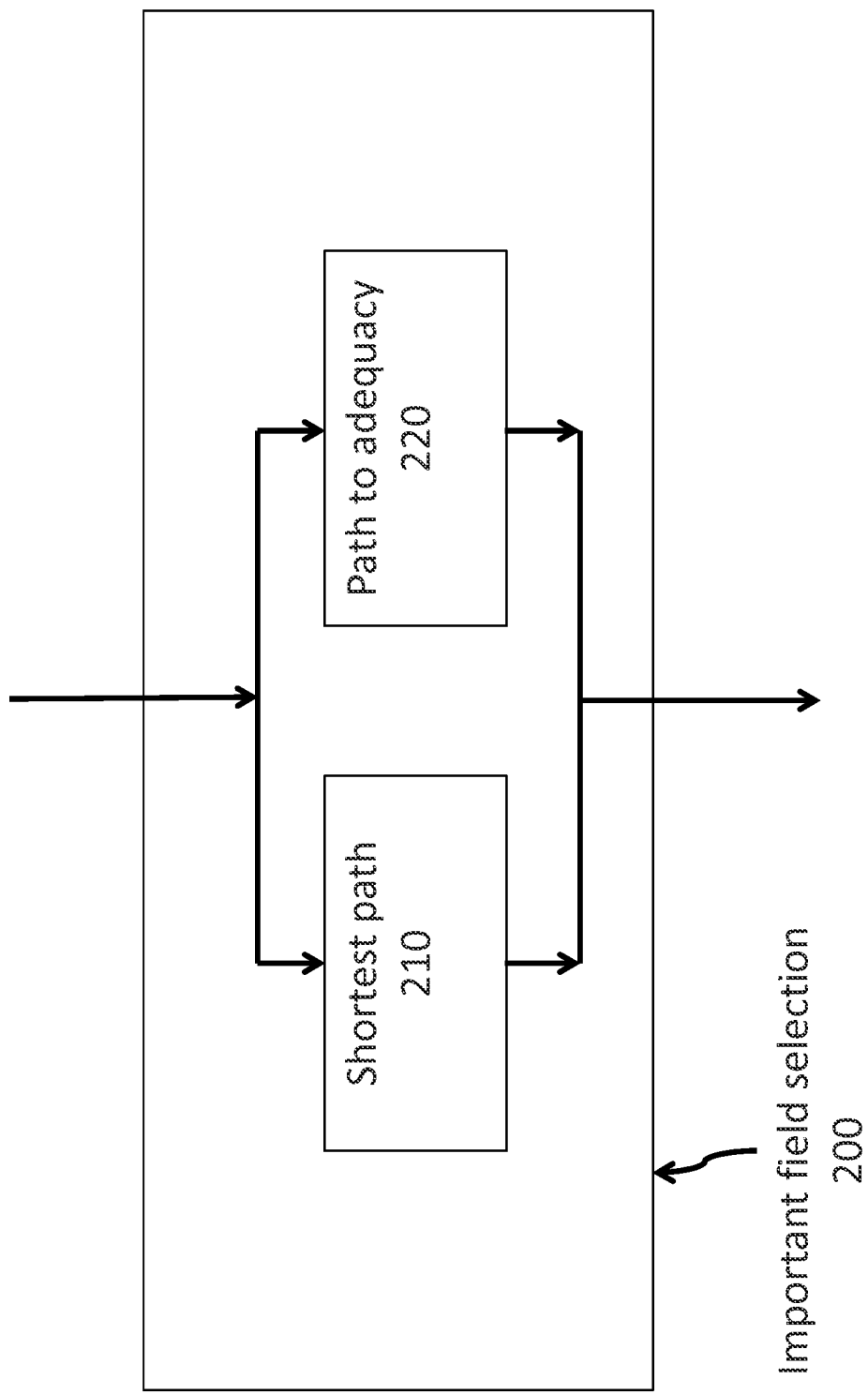
FIG. 3 depicts a flowchart illustrating an exemplary embodiment of a method for important field selection.

As shown in FIG. 3, important field selection 200 may be accomplished by determining the shortest path between the borrower's credit application and the "perfect application" (shortest path 210). Alternatively, important field selection 200 may be accomplished by finding the most important changes between the borrower's application and an "adequate application" that is approved for funding (path to adequacy 220). Both methods are discussed below:

Starting with the first method, the shortest path 210: as its name implies, the shortest path 210 is a protocol in which a list of all fields (variables) are identified where there is difference between the BORROWER DATA and the data of a "perfect" applicant. Given that a "perfect" application (one which receives the highest possible score) will always be funded, one way to build an explanation for why a different application was not approved is to find the set of differences between the unfunded application and the perfect application. Thus, as a preliminary step, the preferred method is to record a list of fields on which the two applications differ.

By way of example, we again refer to the fictitious credit applicant, Mr. "B" whose shortest path is as follows:

| Variable | Mr. "B" | Perfect Applicant | Difference |
| --- | --- | --- | --- |
| Loan Requested | $7,500 | <$3,000 | $4,500 |
| Income | $65K | $100K | $35K |
| Rent | $1,200/mo | $1,000/mo | $200/mo |
| Addresses | 7 addresses | 1 address | 6 addresses |
| SSN | Four (4) | One (1) | 3 SSN |
| Credit Score | 75 | 100 | 25 |

It is important to remember that BORROWER DATA 100 could include dozens variables or hundreds of thousands of meta-variables. And depending on the sophistication of the Lender's credit scoring system, some or most of those variables and meta-variables may not be used in determining a borrower's credit score. The shortest path 210, may not be helpful to the applicant in (1) identifying flaws in his credit profile and (2) determining what actions would be necessary to improve his creditworthiness. Thus, if an applicant takes selective actions in "remedying" portions of his/her credit profile; those changes may not result in a score improvement that would meet the LENDER CRITERIA 600. In other words, the borrower may not be able to recognize which variables are important, and which are just chaff.

As a result, the preferred method in the shortest path 210 includes an intermediate step that eliminates "low impact" fields (which are later omitted from the reason text generation 400, and in turn, the adverse action letter 500 as shown earlier in FIG. 2).

Contrary to logical conclusions, the preferred method for eliminating "low impact" fields does not directly identify "low impact" fields. Rather, the focus is to find the "signals" that are important. And in order to find the signals that are important, the preferred method is to pick the variables which require the smallest transformation (i.e. the shortest path) from a given application to an application with a perfect score. A singular path may be chosen at random with signals then selected based on their relative impact. Alternatively, if multiple paths are available, then lists of variable are ranked by frequency, if possible.

Path-finding is a well-studied problem in machine learning in either a graph or a continuous domain, and there are many well-studied algorithms for finding optimal or near-optimal paths, including, without limitation: ant colony optimization, swarm-based optimization techniques, steepest and stochastic descent algorithms. In addition, there are many multidimensional optimization algorithms available, which has been a major area of study in computer science since the first computer was built. Other path finding algorithms may be used as well depending on suitability to the data set and/or desired outcome. Thus, depending on the nature of the algorithms in the LENDER CRITERIA 600, these path finding algorithms may be applied singularly, or in a hybrid approach, depending on whether the features of the LENDER CRITERIA and/or BORROWER DATA 100 are continuous and/or discrete.

To illustrate the differences between continuous and discrete LENDER CRITERIA and/or BORROWER DATA 100, additional examples may be helpful. A lender criterion might be discrete (e.g., Does the borrower have a job and a checking account?). Similarly, a borrower signal can also be discrete (e.g., is the borrower employed (yes/no)? Does the borrower have a bank account (yes/no)?). Conversely, a lender criterion can be continuous (weight the application negatively according to the average amount of ethanol consumed by the applicant each week). And the corresponding borrower signal would also be continuous (how many beers have you drunk in the last week? Glasses of wine? Mixed drinks/other distilled liquor products?)

The shortest path 210 may be further "filtered" whereby denials for seemingly spurious fields (such as the number of friends one has in social media), could be eliminated from the important field selection 200 list.

Figure 4:
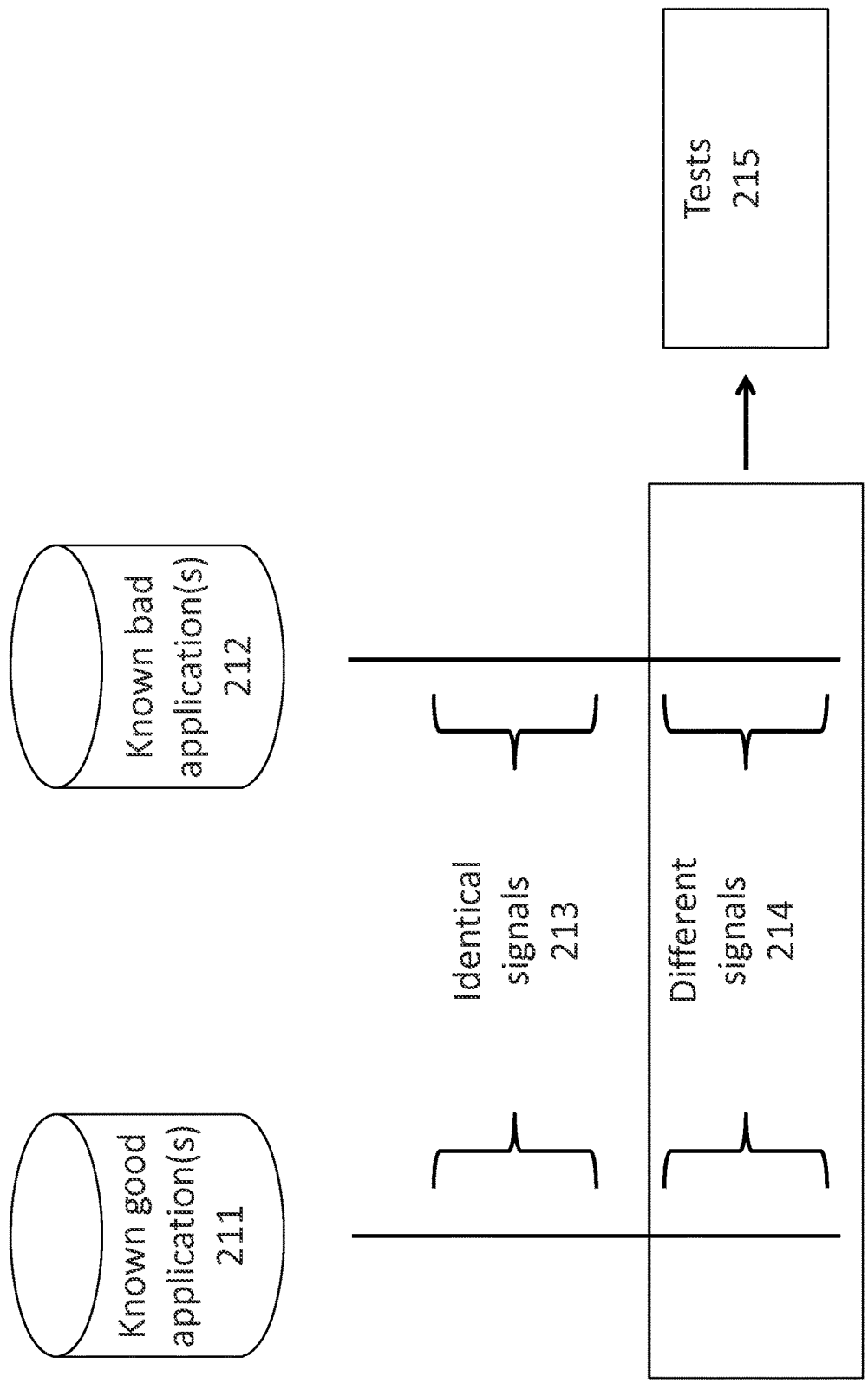
FIG. 4 depicts a flowchart illustrating an exemplary embodiment of a method for finding the path to adequacy.

FIG. 4 provides a second perspective in illustrating the preferred method to find the shortest path 210. In order to find the shortest path 210, a comparison of known good application(s) 211 would be made against known bad application(s) 212. From this comparison, a list of identical signals 213 and different signals 214 could be obtained. Thereafter, the incremental changes to the variables/fields that produce different signals 214 would be run against a series of selection tests 215. One test might determine if changes to individual variables, or sets of variables, result in a sufficiently improved credit score. A second test may eliminate those fields, that when changed, does not result in substantial improvement—or any improvement—in the applicant's credit score. A third test may include a manual filter whereby certain variables/fields are eliminated for administrative purposes.

Referring back to FIG. 3, a second preferred method to important field selection 200 may be achieved by finding the most important changes in a path to an adequate application (path to adequacy 220).

Unlike the shortest path method 210, which generally returns one path (or depending on the tests employed in determining the "perfect application," a few paths), the path to adequacy 220 is likely to return numerous paths to fundability.

The preferred method for generating the path to adequacy 220 seeks the shortest paths from a given application to applications that have scores exceeding a specified threshold (where the threshold is no greater than the maximum possible value of the scoring function). The methods for doing so are similar to that found in the shortest path 210, except that instead of comparing the borrower's profile to a perfect application, it is instead compared to a collection of accepted applicants.

There are a lot more path(s) to adequacy 200 than path(s) to perfection. Unfortunately, the range of possible "acceptable" applications usually is not structured nicely. There are many subtle interactions among different signals in an application. This means that some set of signals is likely to occur. Often, however, there are so many sets of changes that it would be effectively impossible to examine each possibility to reach an acceptable application. Instead, the preferred method of the present invention is to identify a set of changes to the failing application when compared to previously collected approved applicants.

Depending on the sophistication of the LENDER CRITERIA, the number of subsets of the list of exchanged fields grows exponentially in the number of fields. It is impossible to enumerate all of them. Instead, the preferred approach is probabilistic: taking random subsets of the set of exchanged fields, and measuring the resulting score change. In such instances, the preferred method is to use the score changes over all samples. The result turns out to be a rough weighting of the contribution of the individual fields to the final score change.

By way of example, we again refer to the fictitious credit applicant, Mr. "B" whose path to adequacy is as follows:

| Variable | Mr. "B" | Sample Applicant | Difference |
| --- | --- | --- | --- |
| Loan Requested | $7,500 | $1,500 | $6,000 |
| Income | $65K | $48K | N/A |
| Rent | $1,200/mo | $1,000/mo | $200/mo |
| Addresses | 7 addresses | 2 addresses | 5 addresses |
| SSN | Four (4) | One (1) | 3 SSN |
| Credit Score | 75 | 100 | 25 |

Referring back to FIG. 2, the third step is field ranking 300. The preferred approach for field ranking 300 will depend on whether important field selection 200 is accomplished by way of the shortest path method 210 or the path to adequacy 220.

If the shortest path method 210 is employed, ranking, although possible, is purely academic. Indeed, and if well specified, the truncation of the shortest path effectively creates an "all or nothing" result of a long list of fields. In other words, since all changes dictated by the shortest path are necessary to make the application fundable, there is no need to rank the important field selection 200.

If the path to adequacy 220 is employed, the preferred method would regulate the number of fields by ranking the fields so that higher-ranked fields contribute more to a passing score than lower-ranked ones.

Because more than one shortest path to the threshold is likely to exist, the preferred ranking method would employ a voting strategy. In the preferred method, the computer performs many simultaneous searches for many paths to the specified threshold, and then the computer votes based on the number of paths a given field occurs in. Examples include, but are not limited to: membership in the greatest number of paths, changes that have the greatest impact, or some combination thereof. A complete enumeration of the methods is not possible. However, the preferred method will seek to have a meaningful correlation to signal impact, and avoids verging into an arbitrary ranking or scoring function, where possible. Notwithstanding, arbitrary ranking or scoring functions are an alternative method.

For example, assume that Mr. B's BORROWER DATA has 26 possible paths to adequacy 220. And within those lists, a "loan amount-to-income" meta-variable appears 21 times, the variable "social security numbers" appears in 16 times, and the variable "number of addresses" appears 4 times. Let's further assume that one of the protocols in the field ranking 300 says that fields that appear in at least 20% of the total paths (or 5 occurrences) should be reported. In this example, "loan amount-to-income" and "number of social security numbers" would be highest, and in this order.

An alternate method to field ranking 300 is to estimate the "contribution" of each field in each path to the final score difference. As stated above, one method to do so is to take random samples of the fields for any given path and compute the score that arose from just using values in those fields, and take the average difference across all paths containing each field as an importance score (while ranking fields according to their importance).

However, the preferred method for identifying "contributions," (also known as creating "weighted importance scores") is either accomplished by using (1) a ranking by scoring methodology, or (2) through a genetic algorithm.

In the instant invention, either electronic method can be used to more efficiently select the most regularly occurring sets of high-impact changes that could be made within a set of paths (or aggregated portions of paths) that result in credit approval.

The ranking by scoring method significantly reduces the number of searches for adequate paths (or portions thereof) that would lead to an acceptable credit score. Rather than using a purely random selection of variables, the ranking by scoring groups items into small sets to be evaluated tournament style. Thus, by limiting the number of sets that may be grouped, ranking by scoring effectively ranks a limited, yet decreasingly random population of paths, which is thereafter ranked.

Figure 5A:
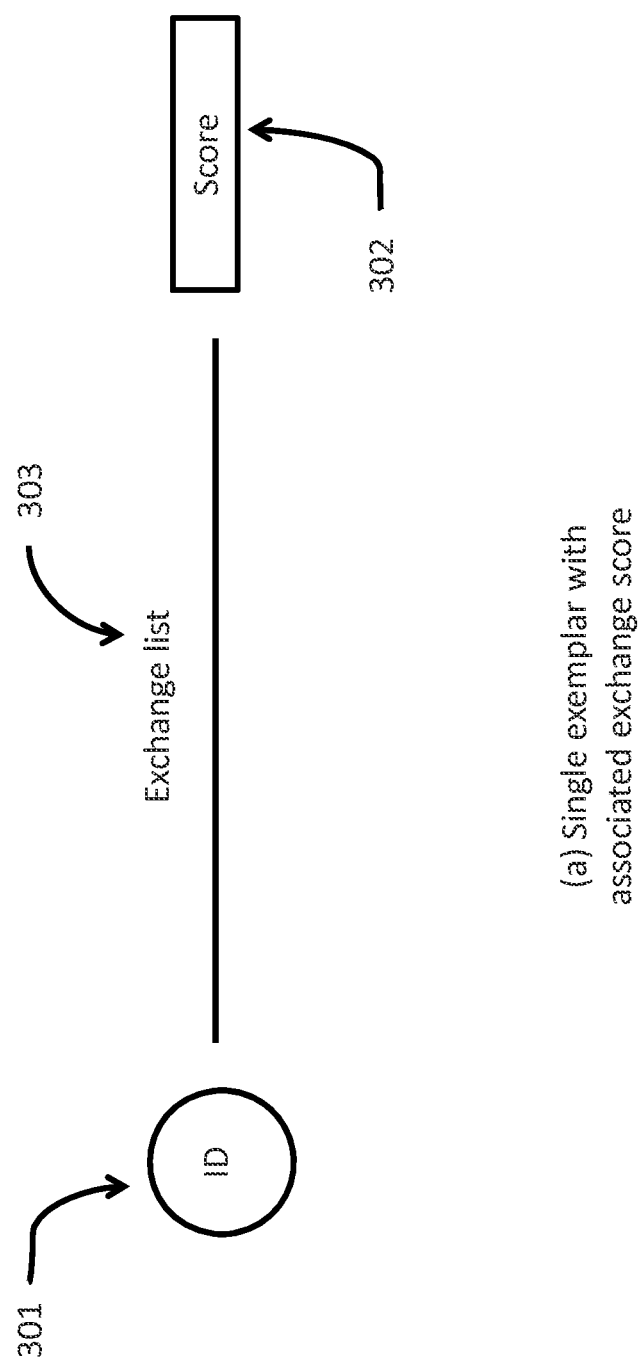
FIG. 5a depicts a flowchart illustrating an alternative exemplary embodiment short titled "swapping codes" as contained in the method for determining the path to adequacy.

A simple example may provide a helpful background: As shown in FIG. 5a (single associated exchange score), occurs when the values of one set of deficient variables (ID 301), has their values replaced (exchange list 303) which results in a new, and preferably acceptable, resulting credit score (score 302).

Figure 5B:
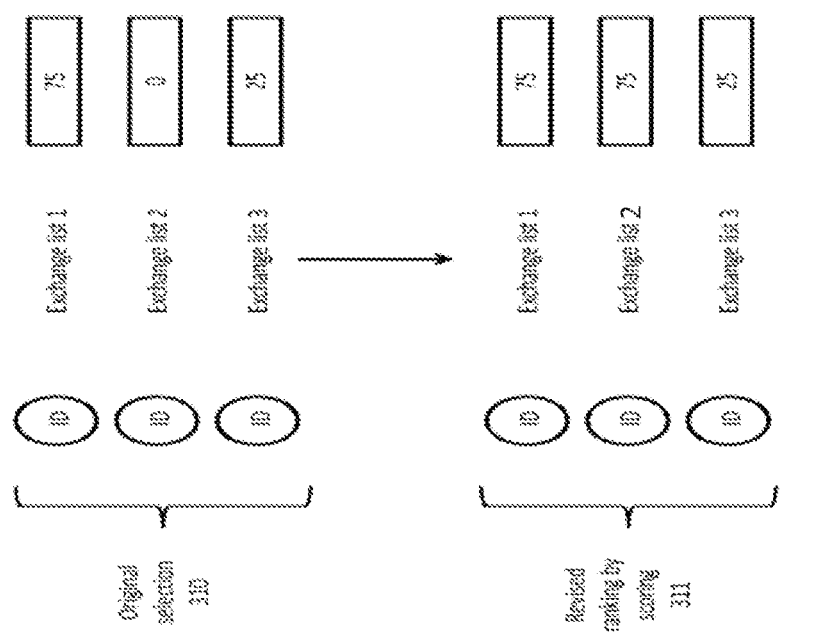
FIG. 5b depicts a flowchart illustrating an alternative exemplary embodiment short titled "selection by scoring" as contained in the method for determining the path to adequacy.

As shown in FIG. 5b, when multiple fields are deficient, ranking may be made by "ranking by scoring." In essence, ranking importance scores is accomplished by replacing the values in an initial set of variables (original selection 310) with a second set of values (revised ranking by scoring 311), and then by scoring the possible replacements. This process is would likely be given a limited universe (e.g., computer, please select 1,000 random sets of variables), then continue exchanging combinations of variables—tournament style— until the most potent changes are identified and ranked.

In the alternative to ranking by scoring, the use of a genetic algorithm may be employed. Genetic algorithms are a well-studied area of computational science that seeks to generate useful solutions to optimization and search problems. In the instant invention, a genetic algorithm would seek out the "pieces of the paths" that most frequently, and most effectively, produce an acceptable credit score.

At its core, a genetic algorithm uses the evolutionary processes of crossover and mutation to randomly assemble new offspring from an existing population of solutions. The parent solutions are then "selected" to generate offspring in proportion to their fitness. The more fit, or better matched to the achieving a credit worthy score, an individual model is, the more often it will contribute its genetic information to subsequent generations.

In the present invention, a genetic algorithm would first engage in mutation (randomly identifying sets of variables and changing values within those sets of variables), "cross over" the sets of variables (i.e., find the most effective sets of variables and values to change), and then "select" a population of paths that are more impactful than others. This process would be iteratively repeated and optimized through "generations" of changes within the sets of variables to determine how effectively each set of changes lead to a passing credit score. During each successive generation, a proportion of the existing population is selected to breed a new generation. Individual solutions are selected through a fitness-based process, where fitter solutions (sets of changes that quantitatively produce greater changes in the credit score) are typically more likely to be selected.

The number of initially selected sets of variables, and generations which traditionally be limited (e.g., computer please pick 1,000 sets of variable or computer please limit your search to 100 generations) to limit processing times.

Figure 5C:
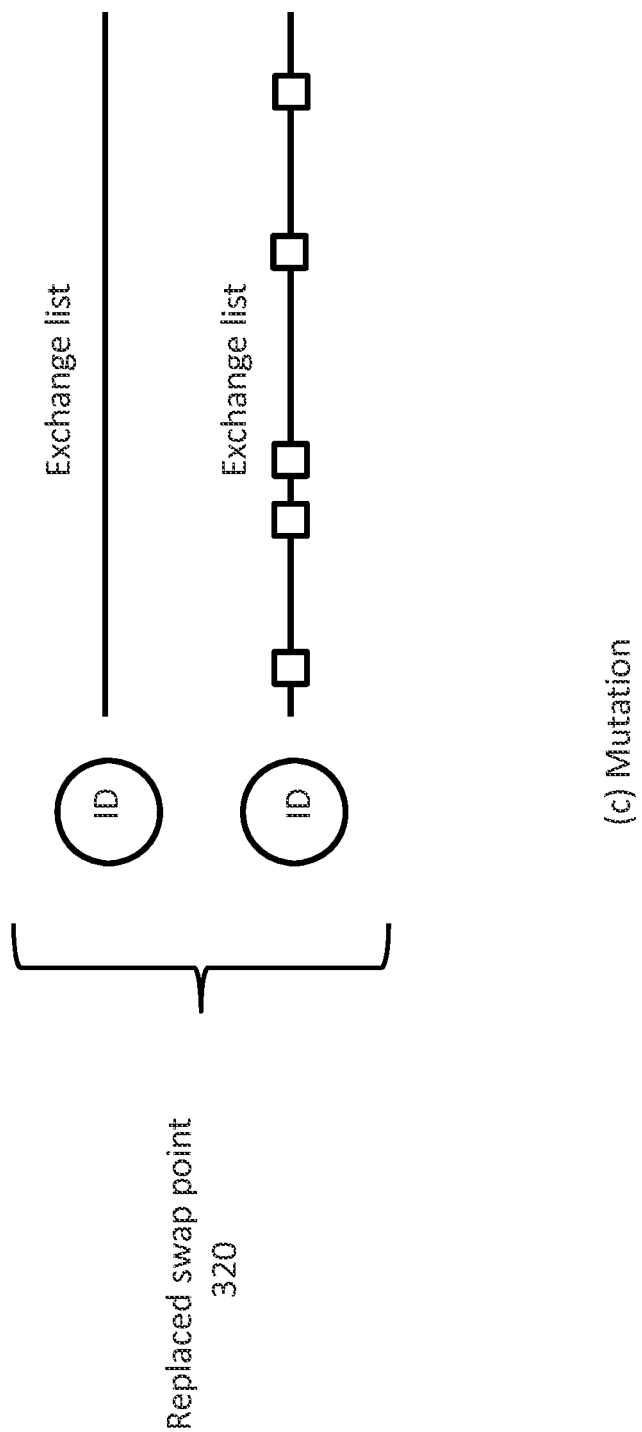
FIG. 5c depicts a flowchart illustrating an alternative exemplary embodiment short titled "mutation" as contained in the method for determining the path to adequacy.

To illustrate the concept graphically, mutation is illustrated in FIG. 5c. In essence, mutation replaces the swap point 320 between one exchange list and another.

Figure 5D:
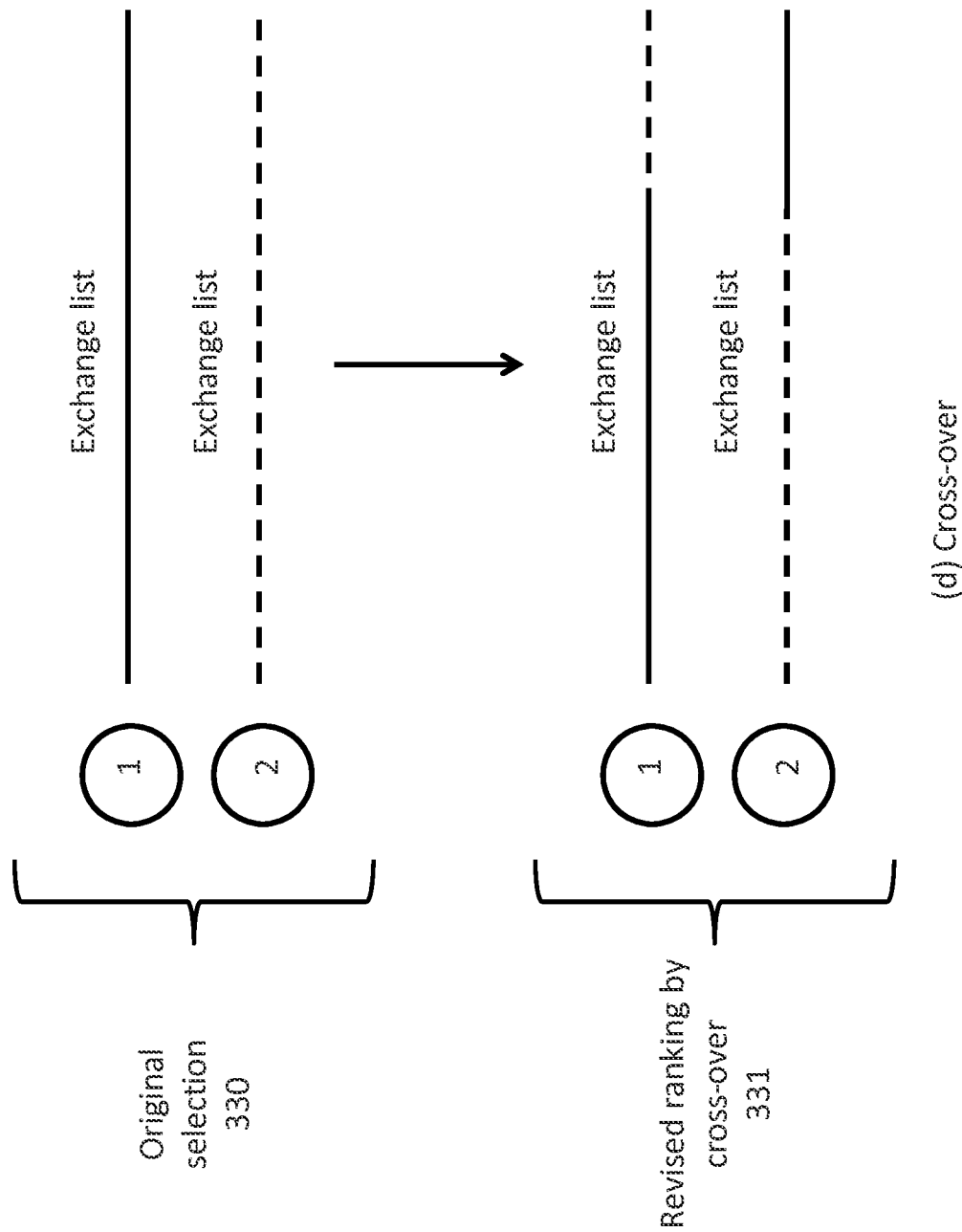
FIG. 5d depicts a flowchart illustrating an alternative exemplary embodiment short titled "cross-over" as contained in the method for determining the path to adequacy.

As shown in FIG. 5d, "cross-over" replaces an initial set of variables/values (original selection 310) and with a second set of variables/values (revised ranking by scoring 311) by mutating possible replacements amongst various possibilities.

Generally the average fitness will increase, since only the best solutions from the first generation are selected for breeding, along with a small proportion of less fit solutions. These less fit solutions ensure diversity within the population of parent solutions and therefore ensure the genetic diversity of the subsequent generation of children.

In other words, mutation and/or cross-over operate to produce a number of different candidates, which are then ranked by their scores (highest to lowest), and then resampled with a weight according to each score.

An example may be helpful to further explain mutation and cross-over. Consider a system with five input signals: age, employment status, bank account status, income, and distance between home and work. The LENDER CRITERIA specifies that only applicants with employment and checking accounts are accepted. Moreover, the LENDER CRITERIA will result in a rejection if the applicant earns less than $40,000 per year and/or the applicant lives more than twenty miles from the applicant's place of employment. Age is completely ignored. Three hypothetical rejected applicants could have the following data:

|  | Applicant C | Applicant D | Applicant E |
|---|---|---|---|
| Age | 61 | 35 | 37 |
| Employment | No, but . . . | Yes | Yes |
| Checking account | No | Yes | Yes |

-continued

|  | Applicant C | Applicant D | Applicant E |
|---|---|---|---|
| Income | $50,000 pension | $35,000 | $30,000 |
| Distance | 0 | 25 | 27 |

In the preferred method, the most "important reasons" for each of the three applicants (C, D, and E) would first look for randomly selected sets of swaps. Each of those swaps would then be scored. By comparing each applicant to funded applications, the preferred method would generate a set of frequencies for each variable (or randomly selected set thereof). Using random substitution of values for each variable (or sets of variables) would take an inordinate period of time. Therefore, the preferred method could exchange values individually, or in blocks. This resulting set produces an ordering: application C needed a job and a checking account, application D would need to live closer to work, and application E would need a checking account and to live closer.

On a broader note, these ranking protocols fall into two categories: continuous parameters and discrete search space. For continuous parameters, algorithms search parameters such as regression and Lyapunov functional reduction are particularly well suited. However, for discrete search space, other suitable search space algorithms, such as pure random search, simulated annealing, and/or other genetic algorithms are better suited.

To recap and further illustrate a practical example of the first three steps in FIG. 2 (Gathering BORROWER DATA 100, performing important field selection 200 by comparing to the LENDER CRITERIA 600, and Field Ranking 300), let's take the example of Mr. B and compare (1) his scored application which did not meet the threshold of fundability to (2) other applications previously scored that were fundable.

First, the preferred method is to gather Mr. B's BORROWER DATA as well as extract the subset of previous applications with scores fundability threshold. Next, and assuming the Important Field selection is accomplished by the path to adequacy 220, the preferred method for important field selection 200 is to create an initial population of exemplars consisting of an index into that subset and a bit vector of the same length as the list of features for the LENDER CRITERIA 600. Each exemplar will be scored by taking Mr. B's un-awarded loan and replacing the list items where the bit vector is 1 with the values from the indexed element of the subset. Finally, the preferred method is to compute the score of Mr. B's modified list. This process will be iteratively repeated until an appropriate termination criterion has been reached (e.g., all paths to fundability have been identified or the method-defined maximum number of paths has been identified).

Thereafter, all of the important field selection 200 entries will be field ranked 300. In this step, a new set of exemplars is randomly selected and weighting according the score. Mr. B's important field selection 200 entries are "mutated" to create a subset of those exemplars by either replacing the index of the associated above-threshold loan or by randomly flipping some number of bits in the bit string. Thereafter, Mr. B's "mutated" important field selection 200 entries are "crossed over." Here, "cross-over" is accomplished by taking a subset of the exemplars by picking pairs of items, and, for each such pair, selecting a single point in the exemplar's bit string, and exchanging the contents of the bit strings beyond that point. The process is repeated until all possible paths to adequacy are ranked and/or voted according to "contribution" of each field has been computed, and sorted from most influential to least influential.

It should be noted that the example of Mr. B is a simple and straightforward genetic algorithm, wherein the preferred method has found that the population converges to a set of exemplars that represent changes to fields/variable that produce significant improvements in Mr. B's creditworthiness (i.e. yielding an acceptable risk profile to issue a loan.).

Referring back to FIG. 2, the fourth and fifth steps are reason text generation 400 and generating an adverse action letter 500.

There are two aspects of reporting the results of the search. First is reporting the variables that are likely to be wrong (reason text generation 400). Second, reporting the reasons for the adverse action (adverse action letter 500). These are not the same, and solving each requires different mechanisms.

Reporting the variables that are likely to be wrong (reason text generation 400) is straightforward, given the weighted contributions computed in the previous section. The preferred method for reason text generation 400 involves recording a list of items with the largest possible weights.

Credit scoring systems often perform veracity checks with third-party data sources that supply information on the borrower. And if a borrower's profile is inconsistent with what is self-reported and/or has values outside the "norm" of other borrowers, those fields will be flagged, and often result in a deduction from the borrower's credit score. Thus, there is a strong probability that important errors will show up with high ranks. Since the values associated with those errors and the sources from which the erroneous signals were drawn will be listed, consumers will be able to recognize opportunities for significantly improving their scores by correcting errors in credit agency files or in their own application data.

At the end of the search and ranking steps, we have one or more "recipes" for transforming a below-threshold loan into an above-threshold one. Unfortunately, the contents of those recipes are not ready to present to an applicant, as they simply are information of the form "this signal might be associated with a change in the score for your application."

Thus, reporting the intelligible reasons for the adverse action letters 500 requires additional steps and procedures. The creation of adverse action letters 500 may be resolved within the standard boundaries of well-studied machine learning paradigms. In essence, the "filtered" field list would then be translated to associated qualitative entries. For example, a variable or meta-variable associated with "number of addresses" would have at least one text entry associated with it (so called "report classes"), such as "your residential address has changed many times in the past five years, indicating that your employment is unstable."

Report classes are lender-defined, examples of which include messages that are prescriptive ("Establish and maintain a bank account for more than 2 years" or "Avoid overdrawing your checking account and try to schedule your essential payments so you aren't late with your bills"), descriptive ("Lexis-Nexis reports have multiple social security numbers associated with your name and address. That could be in error, and, if so, should be corrected,"), and/or monitory ("One or more of the fields in your application exhibits features highly correlated with fraud. You should look at items reported on your application and correct any errors therein.").

The preferred method generates a labeled set of training exemplars which connect the weight pattern for a given application to the report class or classes with which the application is associated. Thereafter, the preferred embodiment could use standard classification techniques such as support vector machines, k means, learned vector quantization, or EM to build a labeling function.

Any of the above-described processes and methods may be implemented by any now or hereafter known computing device. For example, the methods may be implemented in such a device via computer-readable instructions embodied in a computer-readable medium such as a computer memory, computer storage device or carrier signal.

The preceding described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

What is claimed is:

1. A central computing system for generating useful, customized credit adverse action letters to potential borrowers, comprising:
   at least one processor;
   a communications interface in electronic communication with a borrower device and a lender device via a network; and
   a memory comprising computer-readable instructions that, when executed by the at least one processor, cause the central computing system to:
      receive, from the borrower device, borrower data of a credit application for a borrower, wherein the borrower data is characterized by features of a credit worthiness of the borrower;
      receive, from the lender device, criteria of a lender and a model for generating a score for the credit application, wherein the score is relative to a fundability threshold, the model is based on one or more algorithms that compute the score based on the lender criteria and the features of the credit worthiness, and the credit application was denied by the lender based on the score;
      determine important fields in the credit application, comprising determining paths to adequacy each comprising a set of features or modified features of the credit application that, when scored by the model, result in another score above the fundability threshold, wherein the paths to adequacy are determined by:
         receiving, from the lender device, a plurality of previous credit applications by other borrowers whose score was above the fundability threshold;
         generating a bit vector and an index into the previous credit applications to create an initial population of exemplars, wherein the bit vector is the same length as a number of features in the lender criteria and each bit in the bit vector corresponds to one of the features of the credit worthiness used by the model to generate the score; and
      iteratively repeating until all, or a maximum number of, the paths to adequacy, have been identified:
         randomly replacing, with respect to each of the features of the credit worthiness having a bit value of 1 in the bit vector, a value of the corresponding feature taken from the previous credit applications to generate a modified list of features for a modified version of the credit application;

scoring the modified version of the credit application; and determining whether the modified version of the credit application is above the fundability threshold based on the scoring;

rank the important fields by applying a genetic algorithm to generate a final population of exemplars each representing one of the paths to adequacy, wherein the genetic algorithm comprises iteratively repeating for a predetermined number of generations to limit processing time:

generating a first population of exemplars, wherein each exemplar in the first population represents a modified credit application comprising a random selection of the important fields;

representing, in each exemplar in the first population, the important fields as a bit vector;

mutating the bit vectors in each exemplar in the first population by flipping a random number of bits in a bit string of the bit vector to generate mutated exemplars in a second population of exemplars, wherein the second population before the mutation comprises a randomly-selected subset of the first population of exemplars;

selecting pairs of the generated mutated exemplars;

exchanging, for each of the selected pairs, contents of a subset of the respective bit vectors to generate crossed-over exemplars;

scoring each exemplar of the second population after adding the crossed-over exemplars to the second population of exemplars;

selecting, based on the scoring, a third population of exemplars that quantitively have a greater score impact than one or more of the exemplars of the second population; and selecting pairs of the third population of exemplars for mutation and cross over;

rank each field of the final population of exemplars according to its contribution or greatest score impact;

apply weights to the ranked fields according to the ranking;

generate, using the ranked and weighted fields, a labeled set of training exemplars;

apply the machine learning model to the credit application, wherein the weight pattern identifies one or more of the report classes and each of the one or more of the report classes corresponds to stored reason text indicating a credit application denial reason; and provide an adverse action notification for the credit application to the borrower device, wherein the adverse action notification comprises the reason text indicating one or more reasons for the denial of the credit application.

2. The central computing system of claim 1, wherein the computer-readable instructions, when executed by the at least one processor, further cause the central computing system to provide a physical adverse action notification associated with the adverse action notification to the borrower via a physical print server.

3. The central computing system of claim 1, wherein the computer-readable instructions, when executed by the at least one processor, further cause the central computing system to classify the weight pattern to identify the one or more of the report classes.

4. The central computing system of claim 3, wherein the classification uses a labeling function generated based on a technique comprising one or more of a support vector machine, k-means, learned vector quantization, or expectation-maximization.

5. A non-transitory computer readable medium having stored thereon instructions for generating useful, customized credit adverse action letters to potential borrowers comprising executable code that, when executed by one or more processors of a central computing system, causes the one or more processors to:

receive from a borrower device, borrower data associated with a credit application for a borrower, wherein the borrower data is characterized by features of a credit worthiness of the borrower;

receive, from a lender device, criteria of a lender and a model for generating a score for the credit application, wherein the score is relative to a fundability threshold, the model is based on one or more algorithms that compute the score based on the lender criteria and the features of the credit worthiness, and the credit application was denied by the lender based on the score;

determine important fields in the credit application, comprising determining paths to adequacy each comprising a set of features or modified features of the credit application that, when scored by the model, result in another score above the fundability threshold, wherein the paths to adequacy are determined by:

receiving, from the lender device, a plurality of previous credit applications by other borrowers whose score was above the fundability threshold;

generating a bit vector and an index into the previous credit applications to create an initial population of exemplars, wherein the bit vector is the same length as a number of features in the lender criteria, wherein each bit in the bit vector corresponds to one of the features of the credit worthiness used by the model to generate the score; and iteratively repeating until all, or a maximum number of, the paths to adequacy, have been identified:

randomly replacing, with respect to each of the features of the credit worthiness having a bit value of 1 in the bit vector, a value of the corresponding feature taken from the previous credit applications to generate a modified list of features for a modified version of the credit application;

scoring the modified version of the credit application; and determining whether the modified version of the credit application is above the fundability threshold based on the scoring;

rank the important fields by applying a genetic algorithm to generate a final population of exemplars each representing one of the paths to adequacy, wherein the genetic algorithm comprises iteratively repeating for a predetermined number of generations to limit processing time:

generating a first population of exemplars, wherein each exemplar in the first population represents a modified credit application comprising a random selection of the important fields;

representing, in each exemplar in the first population, the important fields as a bit vector;

mutating the bit vectors in each exemplar in the first population by flipping a random number of bits in a bit string of the bit vector to generate mutated exemplars in a second population of exemplars, wherein the second population before the mutation comprises a randomly-selected subset of the first population of exemplars;

selecting pairs of the generated mutated exemplars;

exchanging, for each of the selected pairs, contents of a subset of the respective bit vectors to generate crossed-over exemplars;

scoring each exemplar of the second population after adding the crossed-over exemplars to the second population of exemplars;

selecting, based on the scoring, a third population of exemplars that quantitively have a greater score impact than one or more of the exemplars of the second population; and selecting pairs of the third population of exemplars for mutation and cross over;

rank each field of the final population of exemplars according to its contribution or greatest score impact;

apply weights to the ranked fields according to the ranking;

generate, using the ranked and weighted fields, a labeled set of training exemplars;

train a machine learning model by applying one or more classification techniques and using the set of training exemplars labeled to connect weight patterns to report classes;

apply the machine learning model to the credit application, wherein the weight pattern identifies one or more of the report classes and each of the one or more of the report classes corresponds to stored reason text indicating a credit application denial reason; and provide an adverse action notification for the credit application to the borrower device, wherein the adverse action notification comprises the reason text indicating one or more reasons for the denial of the credit application.

6. The non-transitory computer readable medium of claim 5, wherein the executable code, when executed by the one or more processors, further causes the one or more processors to provide a physical adverse action notification associated with the adverse action notification to the borrower via a physical print server.

7. The non-transitory computer readable medium of claim 5, wherein the executable code, when executed by the one or more processors, further causes the one or more processors to classify the weight pattern to identify the one or more of the report classes.

8. The non-transitory computer readable medium of claim 7, wherein the classification uses a labeling function generated based on a technique comprising one or more of a support vector machine, k-means, learned vector quantization, or expectation-maximization.

9. A method for generating useful, customized credit adverse action letters to potential borrowers, the method implemented by a central computing system and comprising:

receiving from a borrower device, borrower data associated with a credit application for a borrower, wherein the borrower data is characterized by features of a credit worthiness of the borrower;

receiving, from a lender device, criteria of a lender and a model for generating a score for the credit application, wherein the score is relative to a fundability threshold, the model is based on one or more algorithms that compute the score based on the lender criteria and the features of the credit worthiness, and the credit application was denied by the lender based on the score;

determining important fields in the credit application, comprising determining paths to adequacy each comprising a set of features or modified features of the credit application that, when scored by the model, result in another score above the fundability threshold, wherein the paths to adequacy are determined by:

receiving, from the lender device, a plurality of previous credit applications by other borrowers whose score was above the fundability threshold;

generating a bit vector and an index into the previous credit applications to create an initial population of exemplars, wherein the bit vector is the same length as a number of features in the lender criteria, wherein each bit in the bit vector corresponds to one of the features of the credit worthiness used by the model to generate the score; and iteratively repeating until all, or a maximum number of, the paths to adequacy, have been identified:

randomly replacing, with respect to each of the features of the credit worthiness having a bit value of 1 in the bit vector, a value of the corresponding feature taken from the previous credit applications to generate a modified list of features for a modified version of the credit application;

scoring the modified version of the credit application; and determining whether the modified version of the credit application is above the fundability threshold based on the scoring;

ranking the important fields by applying a genetic algorithm to generate a final population of exemplars each representing one of the paths to adequacy, wherein the genetic algorithm comprises iteratively repeating for a predetermined number of generations to limit processing time:

generating a first population of exemplars, wherein each exemplar in the first population represents a modified credit application comprising a random selection of the important fields;

representing, in each exemplar in the first population, the important fields as a bit vector;

mutating the bit vectors in each exemplar in the first population by flipping a random number of bits in a bit string of the bit vector to generate mutated exemplars in a second population of exemplars, wherein the second population before the mutation comprises a randomly-selected subset of the first population of exemplars;

selecting pairs of the generated mutated exemplars;

exchanging, for each of the selected pairs, contents of a subset of the respective bit vectors to generate crossed-over exemplars;

scoring each exemplar of the second population after adding the crossed-over exemplars to the second population of exemplars;

selecting, based on the scoring, a third population of exemplars that quantitively have a greater score impact than one or more of the exemplars of the second population; and selecting pairs of the third population of exemplars for mutation and cross over;

ranking each field of the final population of exemplars according to its contribution or greatest score impact;

applying weights to the ranked fields according to the ranking;

generating, using the ranked and weighted fields, a labeled set of training exemplars;

training a machine learning model by applying one or more classification techniques and using the set of training exemplars labeled to connect weight patterns to report classes;

applying the machine learning model to the credit application, wherein the weight pattern identifies one or more of the report classes and each of the one or more of the report classes corresponds to stored reason text indicating a credit application denial reason; and providing an adverse action notification for the credit application to the borrower device, wherein the adverse action notification comprises the reason text indicating one or more reasons for the denial of the credit application.

10. The method of claim 9, further comprising providing a physical adverse action notification associated with the adverse action notification to the borrower via a physical print server.

11. The method of claim 9, further comprising classifying the weight pattern to identify the one or more of the report classes.

12. The method of claim 11, wherein the classification uses a labeling function generated based on a technique comprising one or more of a support vector machine, k-means, learned vector quantization, or expectation-maximization.

* * * * *